May 9, 1933.  H. W. LANGBEIN  1,907,835
BRAKE OPERATING DEVICE
Filed Dec. 22, 1925
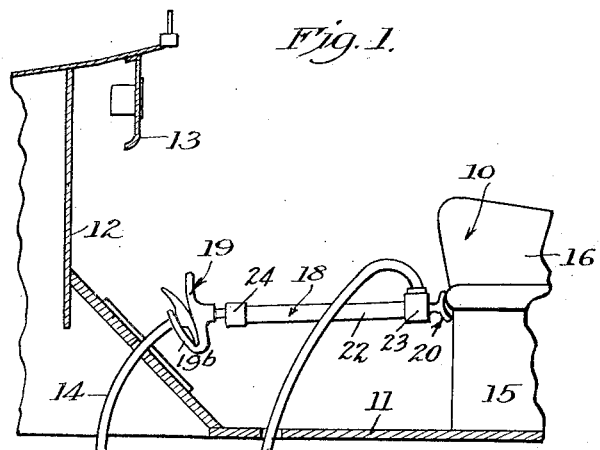
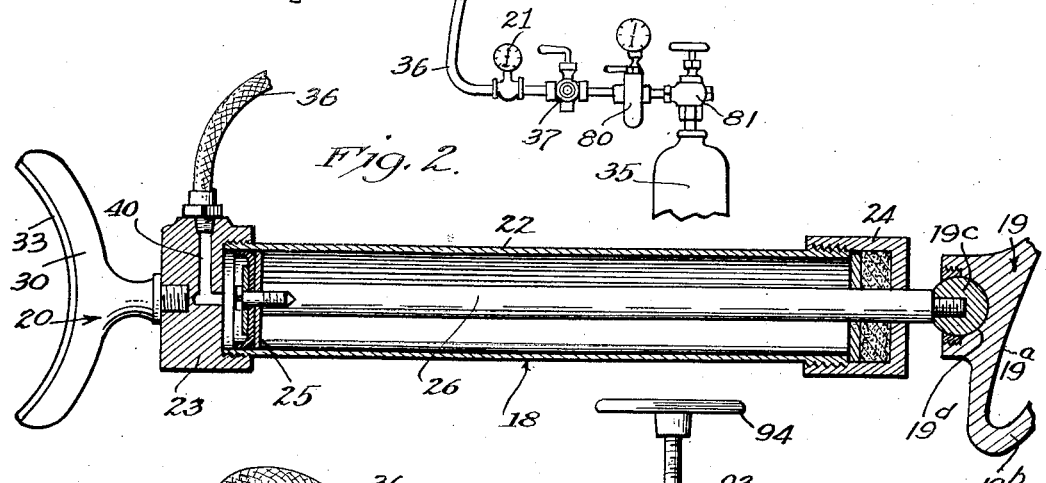
Inventor:
Harold W. Langbein, Patented May 9, 1933

1,907,835

UNITED STATES PATENT OFFICE

HAROLD W. LANGBEIN, OF LOS ANGELES, CALIFORNIA

BRAKE OPERATING DEVICE

Application filed December 22, 1925. Serial No. 77,146.

This invention relates to a brake actuating device and has particular reference to a fluid pressure actuated device particularly useful for operating a brake pedal of a vehicle, or the like.

An object of this invention is to provide a simple, effective, device for holding a brake pedal in an actuated position to allow the brakes controlled by it to be examined, tested, or adjusted while in an operative position.

Another object of my invention is to provide a brake actuating device operable to actuate a brake with any desired pressure.

It is a further object of my invention to provide a brake actuating device with means whereby the pressure with which the brake is actuated is accurately indicated.

It is another object of my invention to provide a brake actuating device which can be easily and quickly applied to vehicle constructions of various sizes and proportions.

A further object of my invention is to provide a brake actuating device of the character above mentioned which involves no springs, adjusting screws, etc., which are unreliable in operation or subject to failure.

It is a further object of this invention to provide a device of the character mentioned in which the pressure applied to the pedal can be controlled from a point removed from the pedal.

The various objects and features of my invention will be best and more fully understood from the following detailed description of a typical preferred form of the invention throughout which description reference is had to the accompanying drawing, in which:

Fig. 1 is a view of a portion of a typical motor vehicle showing the device provided by my invention in operating position therein;

Fig. 2 is a longitudinal detailed sectional view of the mechanism provided by this invention; and Fig. 3 illustrates another form of the invention.

The device provided by my present invention is particularly useful for actuating the brake pedal of a motor vehicle to hold it in an actuated position so that the brakes of the vehicle can be examined or adjusted while in an actuated position. For the purpose of showing the device provided by my invention under typical operating conditions I have in Fig. 1 of the drawing shown it applied to a motor vehicle of typical construction. The portion of the vehicle shown in Fig. 1 includes, generally, the driver's seat 10, floor board 11, dash board 12, instrument part 13, etc. I have shown a brake pedal 14 extending through the forward or inclined portion of the floor board so that it is in a position to be conveniently operated by the driver of the vehicle. The seat 10 shown in the drawing is of the usual construction comprising a stationary base 15, on which is mounted the usual cushion 16.

The construction provided by my invention includes, generally, a cylinder and piston mechanism 18 operable between the brake pedal 14 and a fixed part of the vehicle, for instance the base or stationary part 15 of the seat 10, heads 19 and 20 at the ends of the mechanism 18 for suitably connecting the mechanism with the parts of the vehicle just mentioned, means for supplying fluid pressure to the mechanism 18 to actuate it, and a gage 21 for indicating the pressure of the fluid operating in the mechanism 18.

The cylinder and piston mechanism 18 may be of simple construction including a cylinder 22, caps 23 and 24 closing the ends of the cylinder, a piston 25 slidably carried in the cylinder, and a piston rod 26 connected with the piston 25 and projecting from the cylinder through the cap 24.

The head 19 operates to connect the mechanism 18 with the foot pedal 14 and in the form of the invention shown in the drawing, is connected to the rod 26 of the mechanism 18. The head 19 includes a part 19a adapted to engage the front or head of the pedal, and a hook part 19b at the lower end of the part 19a to engage under or around the head of the pedal and extend on either side of the arm of the pedal. The part 19a is connected to the end of the rod 26 through a ball 19c on the rod fitting a socket 19d in the part 19a. This forms a universal joint.

The head 20 in the construction shown in the drawing is carried by the cap 23. The head 20 includes a plate 30 rigidly connected with the cap. The plate 30 may be shaped to fit or engage a fixed part of the vehicle so that it will not slip, and it may be provided with a facing 33 of material which will prevent it from slipping.

The means provided for supplying fluid under pressure to the mechanism 18 may include a fluid container or reservoir 35, a conduit 36 connecting the reservoir and the interior of the cylinder 22, and a fluid control valve 37. The container 35 may be supplied with fluid under pressure by any suitable means, or may be a container charged with fluid under pressure, for instance it may be a container of gas under high pressure. The conduit 36 extends from the container 35 to the cap 23 where it communicates with a port 40 in the cap opening into the cylinder 22. The control valve 37 may be located at any suitable point between the cylinder and container 35. The valve is preferably a three-way valve operable so that fluid under pressure can be admitted from the container into the cylinder conduit, the connection between the container and cylinder can be cut off and the supply from the container can be cut off and fluid allowed to escape from the cylinder. The indicating gage 21 may be a suitable pressure gage connected at any suitable point between the valve 37 and cylinder 22. I have shown the gage connected in the conduit 36 adjacent the valve 37 so that the operator can conveniently observe the gage as the valve is operated. It is desirable also to provide an adjustable regulating or pressure reducing valve 80 between the container and control valve whereby the fluid under the desired pressure can be constantly supplied to the control valve. I have shown the valve 80 between the shut off valve 81 of the container and the control valve 37.

In using the device it is arranged in the vehicle in the manner shown in Fig. 1, with the head 19 properly connected with the foot pedal 14, and the head 20 abutting or in proper engagement with a fixed part of the vehicle. With the reduction valve 80 set to supply the fluid under the desired pressure the device is actuated by opening the valve 37 to admit fluid into the cylinder 22 so that the piston 25 is forced away from the cap 23, thereby causing the heads 19 and 20 to be forced or moved apart. When the fluid under pressure has been admitted into the cylinder, the valve 37 may be left open so that the fluid under pressure supplied by the valve 80 remains on the device or less pressure can be obtained by cutting off the supply from the valve 80 and allowing some fluid under pressure to escape through the control valve. With the pedal thus actuated the brakes controlled by the pedal can be examined or adjusted. When it is desired to release the pedal, the valve 37 may be opened allowing the fluid under pressure to escape from the cylinder. It will be apparent that the device which I have provided can be easily and quickly applied to the necessary parts of a vehicle, that the cylinder and piston mechanism allows the device to be easily and quickly adjusted to fit the space between the pedal and fixed part of the vehicle, that the gage enables the operator to actuate the brake pedal with any desired pressure, and that the entire handling and operation of the device is simple and convenient.

In Fig. 3 I illustrate a form of operating means including a cylinder and piston mechanism 90 operable to supply fluid under pressure to the cylinder and piston mechanism 18, the mechanism 90 may be connected with the conduit 36 and may include a cylinder 91 and a piston 92 operable in the cylinder. The piston may be operated by a screw 93 through a hand wheel 94, or the like. The desired pressure may be applied to the cylinder 22 by actuation of the screw 93. The gage may be arranged between the mechanism 90 and cylinder 22.

Having described only a typical preferred form of my invention I do not wish to limit myself to the specific details set forth, but wish to reserve to myself any changes or variations that may appear to those skilled in the art or fall within the scope of the following claims.

Having described my invention, I claim:

1. A device for actuating a pedal of a vehicle and including, a fluid pressure actuated mechanism adapted to be arranged between the pedal and a fixed part of the vehicle, means for supplying fluid under pressure to the mechanism to actuate it and fluid pressure responsive means indicating the operating pressure of the mechanism.

2. A device for actuating a pedal of a vehicle, and including, a cylinder and piston mechanism to be arranged between the pedal and a fixed part of the vehicle, means for supplying fluid under pressure to the mechanism to actuate it, and a pressure gage responsive to the pressure of the fluid supplied to the mechanism.

3. A device for actuating a pedal of a vehicle and including, a cylinder and piston mechanism to be arranged between the pedal and a fixed part of the vehicle, means for supplying fluid under pressure to the mechanism from a point removed from the mechanism to actuate the mechanism to operate the pedal, and means for indicating the pressure on the fluid in the cylinder of the mechanism.

4. A pedal actuating device including, a cylinder and piston mechanism to be arranged between the pedal and a fixed part of the vehicle, means for supplying fluid under pressure to the mechanism including a fluid supply reservoir and control means between the reservoir and cylinder, and a gage for indicating the pressure applied to the cylinder.

5. A pedal actuating device including, a cylinder and piston mechanism to be arranged between the pedal and a fixed part of the vehicle, and means for supplying fluid under pressure to the mechanism including a fluid reservoir, a pressure regulating device between the reservoir and cylinder a control valve between the regulating device and cylinder, and a gauge for indicating the pressure on the fluid in the cylinder.

6. A pedal actuating device including, a cylinder and piston mechanism to be arranged between the pedal and a fixed part of the vehicle, heads connected with the ends of the mechanism to engage the pedal and fixed part, a fluid reservoir, a connection between the reservoir and cylinder, a pressure regulating valve in the connection, a control valve between the regulating valve and cylinder, and a gage for indicating the pressure in the cylinder.

7. A device for actuating a pedal of a vehicle including, a fluid pressure actuated mechanism to be arranged between the pedal and a fixed part of the vehicle, means for supplying fluid under pressure to the mechanism from a point removed from the mechanism to actuate the mechanism to operate the pedal, and means controlled by the fluid for measuring the pressure applied to the pedal.

8. A device for actuating a pedal of a vehicle including, a mechanism to be arranged between the pedal and a rigid part in the vehicle operable to move the pedal to various positions and to hold it in such positions, means for operating the mechanism including, a control at a point remote from the mechanism operable to provide for the actuation of the pedal to various positions, and means for measuring the pressure applied to the pedal.

In witness that I claim the foregoing I have hereunto subscribed my name this 15 day of December 1925.

HAROLD W. LANGBEIN.